(12) United States Patent
Kukora et al.

(10) Patent No.: US 7,963,770 B2
(45) Date of Patent: Jun. 21, 2011

(54) SURGICAL-TRAINING DEVICE AND METHOD OF MANUFACTURING THE SAME

(76) Inventors: John S. Kukora, Meadowbrook, PA (US); Richard M. Berman, Dresher, PA (US)

( * ) Notice: Subject to any disclaimer, the term of this patent is extended or adjusted under 35 U.S.C. 154(b) by 0 days.

(21) Appl. No.: 12/221,814

(22) Filed: Aug. 7, 2008

(65) Prior Publication Data

US 2010/0035222 A1 Feb. 11, 2010

(51) Int. Cl.
G09B 23/28 (2006.01)
(52) U.S. Cl. .......................... 434/262; 434/275
(58) Field of Classification Search .................. 434/262, 434/267, 272, 275; 73/862.043, 865.4; 177/199, 177/200, 261, 262; 345/161; 273/455, 447; 248/550
See application file for complete search history.

(56) References Cited

U.S. PATENT DOCUMENTS

| | | | | |
|---|---|---|---|---|
| 3,339,290 A * | 9/1967 | Doyle | | 434/267 |
| 3,857,569 A * | 12/1974 | Goldfarb et al. | | 273/237 |
| 4,037,847 A * | 7/1977 | Lorang | | 473/269 |
| 4,095,352 A * | 6/1978 | Kale | | 434/275 |
| 4,321,047 A | 3/1982 | Landis | | |
| 4,533,109 A * | 8/1985 | Delam | | 248/542 |
| 4,773,864 A * | 9/1988 | Holt | | 434/262 |
| 4,793,428 A * | 12/1988 | Swersey | | 177/144 |
| 4,836,033 A * | 6/1989 | Seitz | | 73/862.046 |
| 4,878,552 A * | 11/1989 | Gebo et al. | | 177/212 |
| 5,403,191 A * | 4/1995 | Tuason | | 434/262 |
| 5,441,413 A * | 8/1995 | Kumar | | 434/275 |
| 5,589,828 A * | 12/1996 | Armstrong | | 341/20 |
| 5,767,840 A * | 6/1998 | Selker | | 345/161 |
| 5,800,179 A * | 9/1998 | Bailey | | 434/262 |
| 5,873,732 A * | 2/1999 | Hasson | | 434/262 |
| 6,033,309 A * | 3/2000 | Couch et al. | | 463/38 |
| 6,329,812 B1 * | 12/2001 | Sundin | | 324/207.16 |
| 6,398,557 B1 * | 6/2002 | Hoballah | | 434/272 |
| 6,428,323 B1 * | 8/2002 | Pugh | | 434/274 |
| 6,654,000 B2 * | 11/2003 | Rosenberg | | 345/156 |
| 6,915,709 B2 * | 7/2005 | Okada | | 73/862.041 |
| 2006/0125790 A1 * | 6/2006 | Edmunds | | 345/161 |
| 2006/0252019 A1 * | 11/2006 | Burkitt et al. | | 434/262 |
| 2007/0166682 A1 * | 7/2007 | Yarin et al. | | 434/267 |
| 2008/0264183 A1 * | 10/2008 | Graham et al. | | 73/862.043 |

* cited by examiner

*Primary Examiner* — Kathleen Mosser
*Assistant Examiner* — Peter R Egloff
(74) *Attorney, Agent, or Firm* — Lee & Hayes, PLLC

(57) ABSTRACT

A surgical-training device for measuring roughness (non-delicate manipulation) during a simulated-surgical technique is described. The device has a housing, a platform, and a sensor module. The platform is movably coupled to the housing, and is configured for three-dimensional motion relative to the housing. The platform is further configured to move from a start position to a displaced position when a force is applied to the platform as a result of a user performing a simulated-surgical technique on the platform. A sensor module, coupled to the housing, is configured to determine when the platform moves a distance (from the start position to the displaced position) that exceeds a preset-threshold distance. If the preset-threshold distance is exceeded, sensor module indicates (by visual and/or auditory alarms within the device, and/or computerized counting and scoring reports) that the user applied excessive force, and was therefore too rough when performing the simulated-surgical technique. A method of manufacturing a surgical-training device is also provided.

19 Claims, 14 Drawing Sheets

SURGICAL-TRAINING DEVICE AND METHOD OF MANUFACTURING THE SAME

TECHNICAL FIELD

This invention is directed, in general, to a surgical training tool, and more particularly, to a surgical training device for practicing a wide variety of basic surgical techniques, and for providing instantaneous auditory and visual feedback to a student or practitioner, or instructor as to whether the techniques are performed with adequate gentleness and delicacy, and/or in an efficient manner with respect to time-to-completion of specific technical tasks.

BACKGROUND

Mastery of basic-surgical techniques is dependent on correct performance of specific motor skills, combined with appropriate rapidity of motion, automaticity of motion, and delicacy of motion. Specific basic-surgical skills include: cutting, knot-tying techniques, suturing techniques, dissection, clamping, clipping, grasping, ligating, cannulation, stapling, cauterization, and suture cutting, among others. Inanimate materials simulating biological tissues or organs or preserved animal tissues are cost-effective materials generally used as simulations of living tissues for the teaching and learning of basic surgical techniques. These skills are generally learned by observation and didactic instruction from an accomplished surgeon tutor. Learning of these basic skills can be enhanced by viewing video presentations of procedure-specific instructions.

Repetitive practice of these skills is necessary to achieve competency and subsequent mastery characterized by rapidity, automaticity, and delicacy. Coordinated motions of both hands to move and stabilize tissues with the non-dominant hand and precise cutting, clamping, or suturing by the dominant hand are characteristic of most basic surgical tasks.

Short initial periods of observation by the tutor of a trainee usually enables the acquisition of proper technique(s), and sequencing of actions. Because of time limitations, the initial tutor is generally unable to assure and oversee the acquisition of mastery. In most cases, a trainee needs to practice these basic-surgical techniques hundreds or even thousands of times to achieve rapidity, automaticity, and delicacy of the techniques.

While this repetitive practice to achieve mastery has traditionally been achieved while the trainee practices operative techniques on living patients after an initial introduction to basic technical principles, practice in a safe surgical-simulation environment is preferable for reasons of patient safety.

Presently, there exist virtual and non-virtual simulators on which to practice basic-surgical skills. Most virtual simulators rely on sophisticated haptic sensors and software integrated with large computer systems that are immobile and often extremely expensive. Teaching institutions that can afford them are usually only able to purchase a limited quantity. Therefore, students often have restricted access and limited times to practice surgical techniques using virtual simulators.

Furthermore, most virtual simulators are designed to teach advanced-surgical procedures, such as organ-specific laparoscopic surgery and robotic surgery, or endoscopic or endovascular procedures. These simulators are typically designed for trainees already competent or masterful with basic-surgical techniques and do not offer a suitable environment for practicing basic-surgical skills. Some virtual simulators do provide feedback to the trainee of excessive roughness during the task performance.

Additionally, many virtual training environments require the observation of skill performance in a two-dimensional environment on a planar video monitor screen that fails to provide a realistic three-dimensional environment required for initial learning and practice of basic surgical skills.

Non-virtual surgical-simulator tools such as tissue models and knot-tying boards permit the trainee to practice basic-surgical techniques, but without feedback whenever excessive forces are applied. Although the trainee may repetitively practice the technique on such training devices and ultimately become more proficient, the trainee may also unknowingly use and engrain excessively forceful surgical manipulations in so doing. In subsequent live practice, such overly forceful manipulations can shear, tear, or damage the living tissue of a patient.

SUMMARY

To address the above-discussed deficiencies of the prior art, this invention, provides a portable surgical-training device for measuring roughness (non-delicate, excessively forceful manipulations) during performance of basic-surgical techniques.

In one embodiment, the device includes a housing, a platform, and a force-sensor module. The platform is movably coupled to the housing, and is configured for three-dimensional motion relative to the housing. The platform is further configured to move from a "start" position to a displaced position when a force is applied to the platform as a result of a user performing a simulated-surgical technique on the platform. A sensor module is coupled to the housing, and is configured to determine when the platform moves a distance (from the start position to the displaced position) that exceeds a preset-threshold distance corresponding to a preset-threshold force. If the preset-threshold distance is exceeded, the sensor module indicates (such as by a visible and/or audible alarm) that a user applied excessive force, and was, therefore, too rough when performing the simulated surgical technique. A method of manufacturing this surgical-training device is also provided.

The use of auditory and visual feedback by the device—indicating excessive roughness transgressions caused by either hand during the technique—is provided to facilitate initial acquisition of gentleness with technical proficiency.

In one embodiment, the device includes a processing system (remote or local) that records different parameters detected during a practice session. For example, the device may record times to surgical-task completion. The device may also record practice sessions by dates, minutes, and hours, type of technique practiced, number of training simulations completed. Further, the device may also measure transgressions and record the direction in which they occurred, e.g., in the X, Y and/or Z direction, such as according to the Cartesian-coordinate system.

In one embodiment, data recorded by the processing system may be displayed on a user interface (remote or local). For instance, the processing system may provide feedback to the trainee with summarized scores of roughness transgressions in three-dimensional axes for sequenced techniques to facilitate learning. Additionally the device through the user interface may display or print reports of training, and computerized scoring of efficiency, delicacy, and observer scoring of proficiency In operation, the device can be used with two or more learners to simulate tasks done by a surgeon with one or more assistants to acquire team surgical skills having shared gentle technique and efficiency. The device can also be placed in simulated surgical environments, such as within a laparoscopic box trainer to practice basic laparoscopic or robotic surgical skills with feedback relating to gentleness and efficiency. It can also be placed within a constraining container to simulate operative tasks performed deep within a human body cavity.

The foregoing outlines an embodiment of the invention so that those skilled in the relevant art may better understand the detailed description that follows. Additional embodiments and details will be described hereinafter. Those skilled in the relevant art should appreciate that they can readily use any of these disclosed embodiments as a basis for designing or modifying other structures or functions for carrying out the invention, without departing from the spirit and scope of the invention.

Reference herein to "one embodiment", "an embodiment", or similar formulations herein, means that a particular feature, structure, operation, or characteristic described in connection with the embodiment, is included in at least one embodiment of the present invention. Thus, different appearances of such phrases or formulations herein do not necessarily refer to the same embodiment. Furthermore, various particular features, structures, operations, or characteristics may be combined in any suitable manner in one or more embodiments.

BRIEF DESCRIPTION OF THE DRAWINGS

The detailed description is explained with reference to the accompanying figures. In the figures, the left-most digit(s) of a reference number identifies the figure in which the reference number first appears. The figures are not drawn to scale.

DETAILED DESCRIPTION

Exemplary System Embodiment

Figure 1:
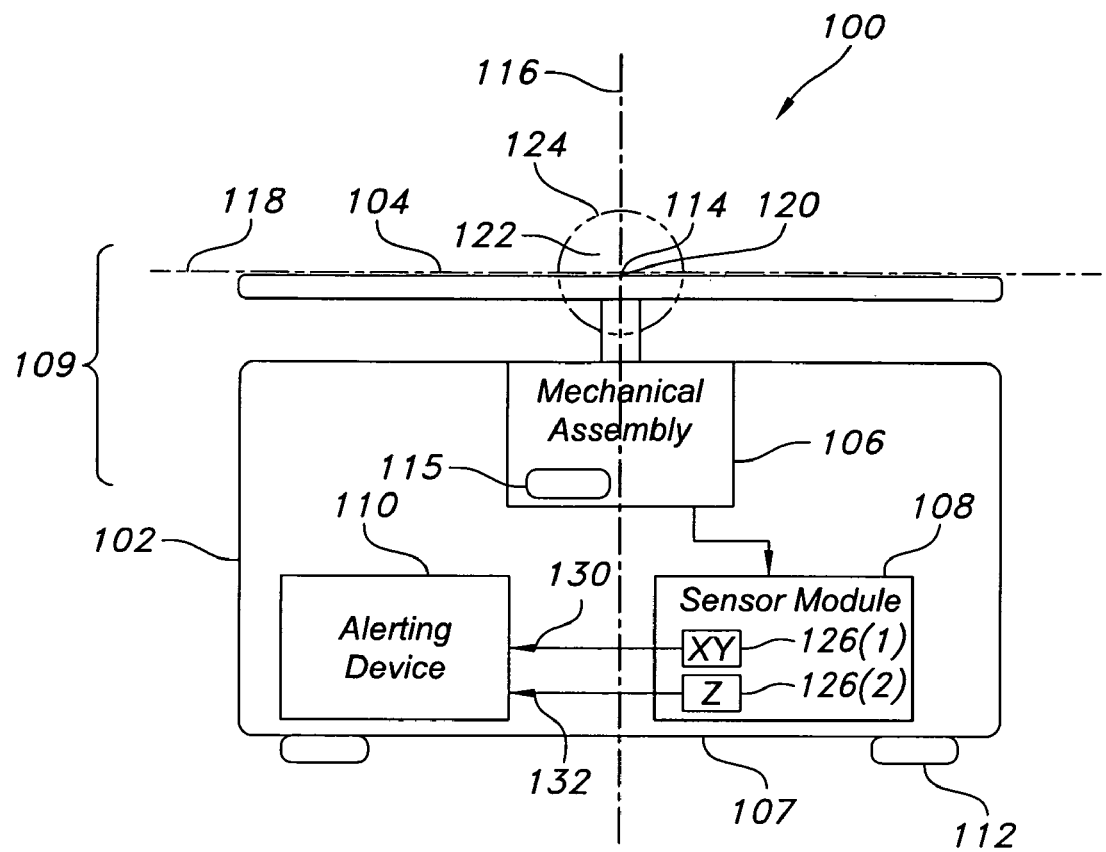
FIG. 1 is a system view of one embodiment of a surgical-training device constructed in accordance with the principles of the invention.

Initially referring to FIG. 1, is a system view of one embodiment of a surgical-training device 100 constructed in accordance with the principles of the invention. The illustrated embodiment of surgical-training device 100 includes a housing 102, a platform 104, a mechanical assembly 106, a sensor module 108, and an alerting device 110.

Housing 102 may be constructed of any suitable material that can withstand the rigors of being transported and used by surgical trainees, e.g., plastic, aluminum, fiberglass, steel, wood, or any combination thereof. For example, in one embodiment housing 102 is composed of a resilient plastic.

In one embodiment, housing 102 is pocket sized, being generally square in shape and is approximately 2×2 inches in width and length, and about an inch high. As appreciated by those skilled in the art, after having the benefit of this disclosure, housing 102 may be of other sizes, and shapes such as spherical, rectangular, or other configurations.

Housing 102 contains system electronics, and mechanical devices, while providing a stable framework for performing surgical procedural tasks on platform 104. Additionally, skid pads 112, such as rubber feet, are located at a base 107 of housing 102 to prevent housing 102 from easily moving or sliding when placed on a working surface such as a tabletop.

In one embodiment, platform 104 is located on an upper portion 109 of housing 102. Platform 104 serves as a physical structure on which a user of device 100 can practice a simulated surgical task. As used herein the term "platform" refers to any structure on which a simulated-surgical technique may be practiced. Exemplary configurations for platform 104 are described in more detail below.

Platform 104 is coupled to housing 102. In particular, platform 104 is connected to mechanical assembly 106, which is attached to housing 102. Platform 104 has a longitudinal axis 116 and horizontal axis 118 that converge at a pivot point 114. In the exemplary illustration, pivot point 114 is positioned at an upper and center axis of platform 104. Alternatively, pivot point 114 may be positioned off center with respect housing 102, and at different points/axes above, below, or off center of platform 104.

Mechanical assembly 106 supports platform 104, and permits pivot point 114 of platform 104 to move three-dimensionally relative to housing 102. A force-resisting device 115 (to be described) in assembly 106 permits pivot point 114 to move in the XY, (i.e., horizontal, such as sideways) and/or Z (i.e., vertical, such as up or down) planes, including angular directions that include combinations of each direction, and plane thereof. Accordingly, when a force is applied to platform 104 in one direction, platform 104 will move in the same direction as the force applied.

In addition to moving sideways and up/down, mechanical assembly 106 also permits pivot point 114 to rotate in a clockwise or counter-clockwise direction, such as when a torque or sheer force is applied to platform 104. It is also possible for pivot point 114 to rotate while simultaneously moving up or down, and/or sideways.

Assembly 106 typically maintains pivot point 114 in a stationary position, i.e., start position 120, when no external force is applied to platform 104. When an external force is applied to platform 104, mechanical assembly 106 is configured to impart a resistance force that is equal to and in the opposite direction of the external applied force. When the magnitude of the external force exceeds a preset threshold force (the preset threshold force is constantly maintained by assembly 106 on platform 104) pivot point 114 will move from start position 120 to a displaced position 122. Upon release of the external force, pivot point 114 automatically returns to start position 120 as a result of the assembly maintaining a resilient/resistive force on platform 104.

Assembly 106 also prevents pivot point 114 from moving beyond a preset-threshold distance 124. For example, assembly 106 stops pivot point 114 from moving beyond a preset-threshold distance 124, when an external force is applied to platform 104, and the magnitude of this force exceeds a maximum predefined value. Also, assembly 106 limits how far pivot point 114 is displaced in any direction. On the other hand, assembly 106 also permits pivot point 114 (and hence platform 104) to freely move essentially frictionlessly, three-dimensionally (i.e., up, down, sideways, and angular combinations thereof) between start position 120 and preset-threshold distance 124. Furthermore, platform 104 may also tilt from a level position to an angled positioned, which can displace pivot point 114 from its start position 120.

Figure 2:
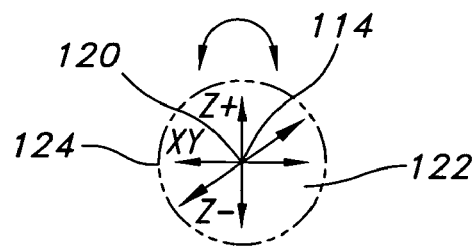
FIG. 2 shows possible three-dimensional movement of a pivot point from its start position to its preset-displacement distance.

FIG. 2 shows possible three-dimensional movement of pivot point 114 from its start position 120 to its preset-threshold distance 124. While the range of motion for pivot point 114 is circular in the exemplary illustration of FIG. 2, it is appreciated by those skilled in the art, with the benefit of this disclosure, that the range of motion may be elliptical and/or even non-cylindrical, in certain embodiments. It is also possible for the range of motion to be asymmetrical, with the preset-threshold distance 124 varying in distance depending on the direction of motion for pivot point 114. For example, the range of motion for pivot point 114 may be further in one or more vertical directions than the horizontal directions, or vice versa.

Referring back to FIG. 1, coupled to assembly 106 is a sensor module 108. The combination of assembly 106 and sensor module 108 forms an electromechanical assembly. Sensor module 108 includes one or more electrical sensors 126, coupled to assembly 106. Each sensor detects when pivot point 114 reaches preset-threshold distance 124. For example, a first electrical sensor 126(1) may detect when pivot point 114 moves a preset-threshold distance 124 in a horizontal direction (XY plane), whereas, a second electrical sensor 126(2) may detect when pivot point 114 moves a preset-threshold distance 124 in a vertical direction.

Sensors 126 transmit an electrical signal each time either sensor 126 detects pivot point 114 moving a distance corresponding to its preset-threshold distance 124. For example, in one embodiment, sensor 126(1) transmits a signal, via wire 130, indicating that pivot point 114 moved horizontally a preset-threshold distance 124. Sensor 126(2) transmits a signal, via wire 132, indicating that pivot point moved vertically a preset threshold distance 124.

Sensor module 108 may be directly or indirectly coupled to an alerting device 110, such as a speaker and/or lighting device. Alerting device 110 triggers a perceptible alert, such as the activation of a visible light and/or audible sound, when either sensor 126 detects pivot point 114 traveling a preset-threshold distance 124. Sensor module 108 may also track each occurrence pivot point 114 is displaced a preset-threshold distance 124 based on receipt of active signals from sensors 126. Sensor module 108 may also quantify and classify the occurrences based on which direction (horizontal, vertical, or any angular combination thereof) pivot point 114 moved when reaching a preset-threshold distance 124.

Having introduced exemplary embodiments of surgical-training device 100, it is now possible to describe other exemplary implementations for elements of device 100 in more detail.

Exemplary Electromechanical Assembly

Electromechanical assembly includes mechanical assembly 106 and portions of sensor module 108. Referring first to mechanical assembly 106, in one embodiment mechanical assembly 106 is configured to (i) support platform 104 (FIG. 1), (ii) permit pivot point 114 (FIG. 1) of platform 104 to move three-dimensionally (FIGS. 1 and 2) relative to housing 102, (iii) maintain pivot point 114 in a stationary position when no external force is applied to platform 104, (iv) apply an opposing resistive force when an external force is applied to platform 104; and (v) prevent pivot point 114 from being displaced beyond a preset-threshold distance 124.

Exemplary Horizontal-Movement Components

Figure 3:
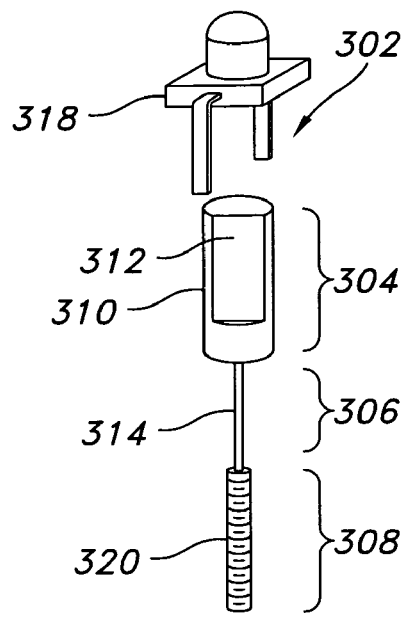
FIG. 3 shows an embodiment of a central member, which provides motion and causes resistance in the horizontal axis (i.e., XY planes).

In one embodiment mechanical assembly 106 includes a central member, which acts as a portion of force-resisting device 115 for mechanical assembly 106. For example, FIG. 3 shows an embodiment of central member 302, which provides motion and causes resistance in the horizontal axis (i.e., X Y plane). Central member 302 includes an upper end 304, a central part 306, and a lower end 308. Each of these three parts (304, 306, 308), may be manufactured separately and fixed to each other by welds, and/or other fastening means, or may be manufactured as a single, integrated part. Attached to upper end 304 is a light emitting diode 318 which may form part of an alerting device 110 (FIG. 1).

Upper end 304 includes a generally cylindrical post 310 consisting of an electrically conductive surface, such as brass, steel, or aluminum. In one embodiment, post 310 is approximately 0.5 inches in length, with a diameter of approximately 0.125 inches. As appreciated by those skilled in the art, after having the benefit of this disclosure, post 310 may come in other suitable shapes, and sizes. Additionally, post 310 may include a cutout portion 312, which may provide space for inserting an electrical lead, or provide a mechanical interface with other elements of central member 302.

Central part 306 includes a spring element 314. In one embodiment, spring element 314 is also, cylindrical in shape and is approximately 0.25 inches in length, with a diameter of approximately 0.025 inches. As appreciated by those skilled in the art, with benefit of this disclosure, spring element 314 may come in other suitable shapes, materials, and sizes. In one embodiment, spring element 314 is comprised of an electrically conductive material, such as music wire or tempered stainless steel.

Lower end 308 includes a male threaded screw 320. In one embodiment, screw 320 is also cylindrical in shape and is approximately 0.5 inches in length, and has a diameter of approximately 0.10 inches. As appreciated by those skilled in the art, after having the benefit of this disclosure, screw 320 may come in other suitable shapes, materials, and sizes. Additionally, other coupler interfaces may be used in place of a threaded screw. In one embodiment, lower end 308 is comprised of an electrically conductive material, such as brass.

Figure 4:
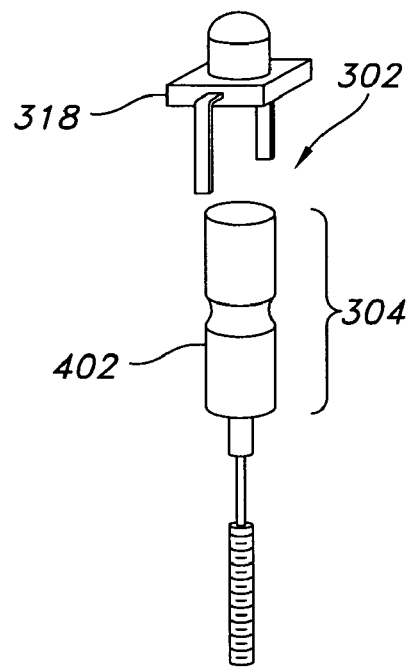
FIG. 4 shows another embodiment of the central member.

FIG. 4 shows another embodiment of central member 302. As depicted in FIG. 4, upper end 304 comprises a battery 402 such as a Panasonic® BR425, BR435, or any other suitable slender battery design. Attached to battery 402 is a light-emitting diode 318 similar to that shown in FIG. 3.

Figure 4A:
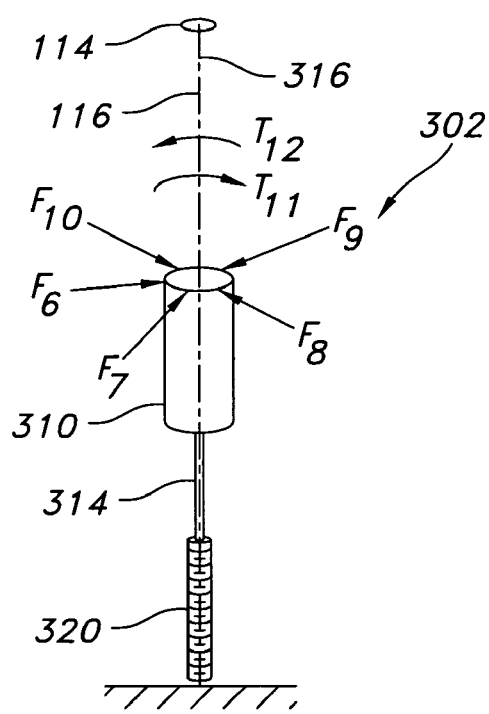
FIG. 4A illustrates multiple external forces F6, F7, F8, F9, F10, and torques T11, T12, which a central member of the surgical device resists by producing horizontal resistive forces and torques in the opposite direction of external applied forces and torques.

As depicted in FIG. 4A, central member 302 also includes a longitudinal-center axis 316 that extends through, and corresponds to the longitudinal-center axis 116 (FIG. 1) of pivot point 114 (FIG. 1). Central member 302 provides a resistive force in the horizontal directions. For example, FIG. 4A illustrates multiple external forces F6, F7, F8, F9, F10, and torques T11, T12, which central member 302 resists by producing horizontal resistive forces and torques in the opposite direction of the external applied forces and torques.

Referring to FIGS. 3, 4, and 4A, central member 302 may be of a slender size to fit within an electrically-conductive tube.

Figure 5:
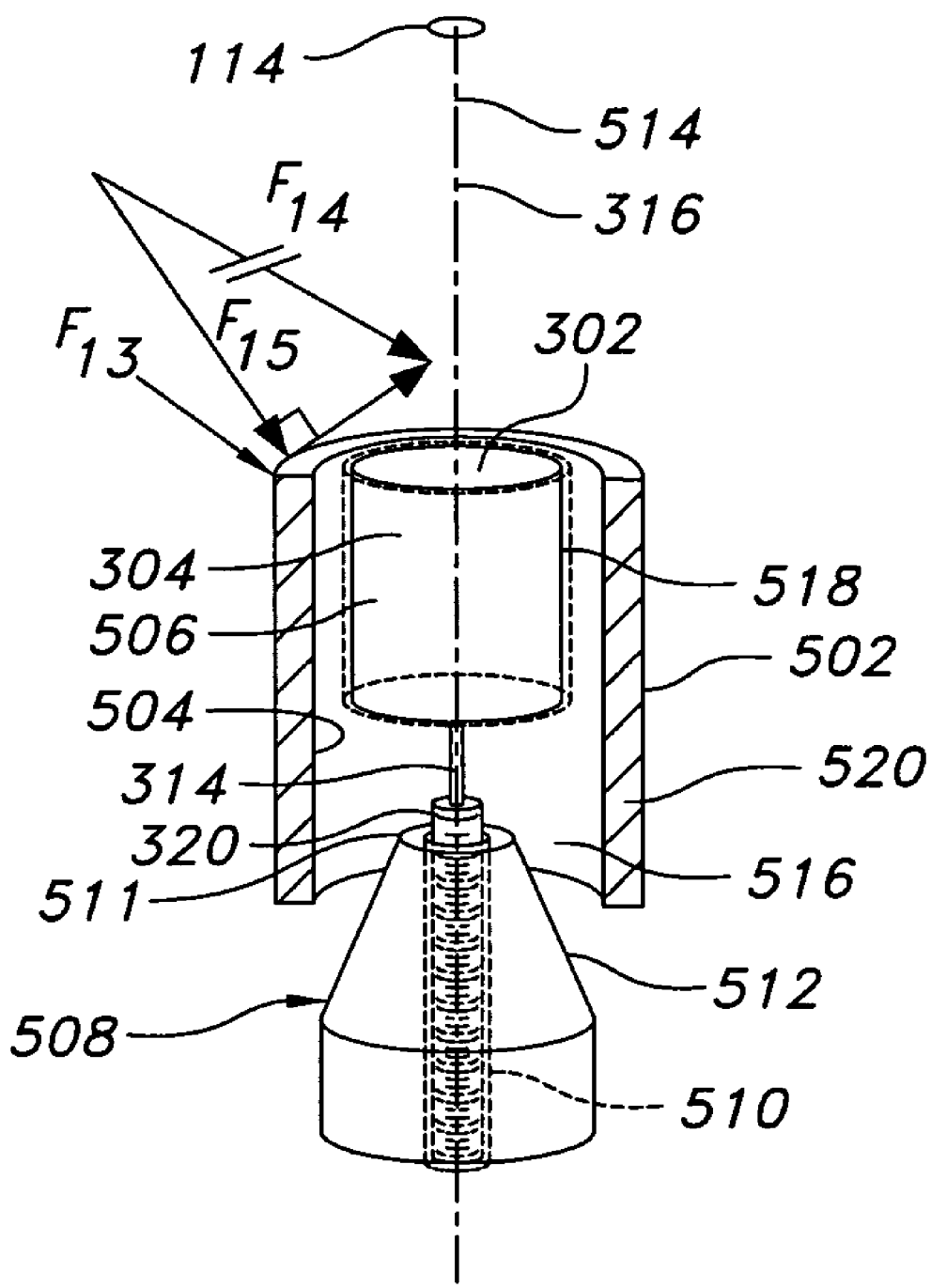
FIG. 5 shows a cross-sectional and cut-away view of an exemplary cylindrical tube configured with a slightly larger inner diameter (if circular) than an upper end of the central member.

For example, FIG. 5 shows a cross-sectional and cut-away view of an exemplary electrically conductive cylindrical tube 502 configured with a slightly larger inner diameter (if circular) than upper end 304 of central member 302. As depicted in FIG. 5, central member 302 is disposed centrally within tube 502, such that an inner surface 504 of tube 502 is insulated from and coextensive with an outer surface 506 of upper end 304. Insulator 518 is shown in a concentric position. In one embodiment, tube 502 is of a length of approximately 0.75 inches. As appreciated by those skilled in the art, after having the benefit of this disclosure, tube 502 may come in other suitable shapes, materials, and sizes.

Also shown in FIG. 5 is a conical base 508 constructed, at least in part, of an electrically conductive material. Conical base 508 includes a centrally located female thread 510, which is complementary to screw 320. Conical base 508 tapers inwardly towards its upper end 511, such that an outer surface 512 of conical base 508 is narrower than inner surface 504 of tube 502.

Further, when central member 302 is stationary (such as when no external forces are applied thereto) a longitudinal-center axis 316 of central member 302 and a longitudinal-center axis 514 of base 508 align with each other. For instance, both longitudinal-center axes 316 and 514 align when pivot point 114 (FIG. 1) is in a stationary position, i.e., start position 120 (FIG. 1). When both axes 316 and 514 align, there is a gap 516 between inner surface 504 of tube 502, and outer surface 512 of conical base 508. In one embodiment the distance of gap 516 is approximately 0.015 inches. As appreciated by those skilled in the art, with the benefit of this disclosure, the distance of gap 516 may be larger or smaller.

With reference to FIG. 5, when an external force is applied to upper end 304 via pivot point 114 causing spring element 314 to bend, longitudinal-center axis 316 of central member 302 and a longitudinal-center axis 514 of base 508 will not align with each other. For example, when pivot point 114 (FIG. 1) is displaced from a stationary position, i.e., start position 120 (FIG. 1) to a preset-threshold distance 124 (FIG. 1), then inner surface 504 of tube 502, and outer surface 512 of conical base 508 will touch each other at a location opposite to the side where an external force is applied to pivot point 114 (FIG. 1).

Figure 6:
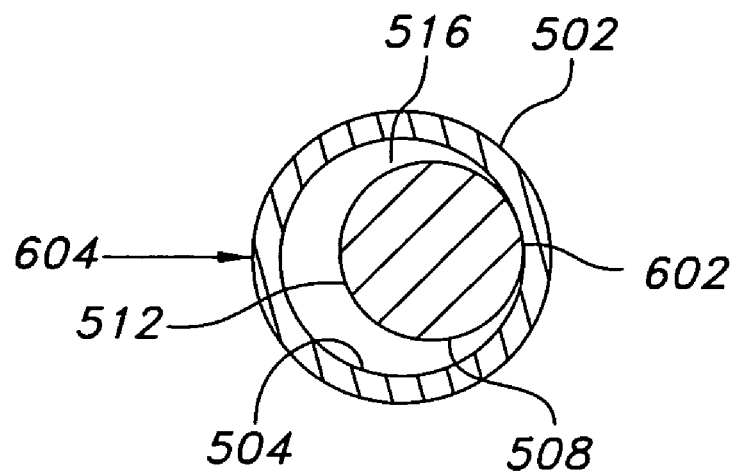
FIG. 6 shows a cross sectional top view of the conical base and tube with their longitudinal-center axes misaligned with each other.

FIG. 6 shows a cross sectional top view of conical base 508 and tube 502, when longitudinal-center axis 316 of central member 302 and a longitudinal-center axis 514 of base 508 will not align with each other. This view corresponds to the above scenario when pivot point 114 (FIG. 1) is displaced from a stationary position, i.e., start position 120 (FIG. 1) to a preset-threshold distance 124 (FIG. 1), and inner surface 504 of tube 502, and outer surface 512 of conical base 508 touch each other at a location 602 opposite an external force 604 is applied to pivot point 114. This contact between tube 502 and base 508 causes an electrical connection (to be described).

It is possible for pivot point 114 to move a displaced distance less than preset-threshold distance 124, such that longitudinal-center axis 316 of central member 302 and the longitudinal-center axis 514 of base are misaligned, but a gap 516 between inner surface 504 of tube 502, and outer surface 512 of conical base 508 remain although the distance of the gap is reduced in size.

As appreciated by those skilled in the art, after having the benefit of this disclosure, the size of gap 516 may be adjusted to allow for more or less freedom of movement in the horizontal planes. A larger gap requires more force (i.e., less sensitive touch) applied to platform 104, to displace pivot point 114 (hence platform 102) a preset-threshold distance 124. Whereas, a smaller gap requires less force (i.e., a more sensitive touch) applied to platform 104 to avoid displacing pivot point 114 a preset-threshold distance 124.

Figure 7:
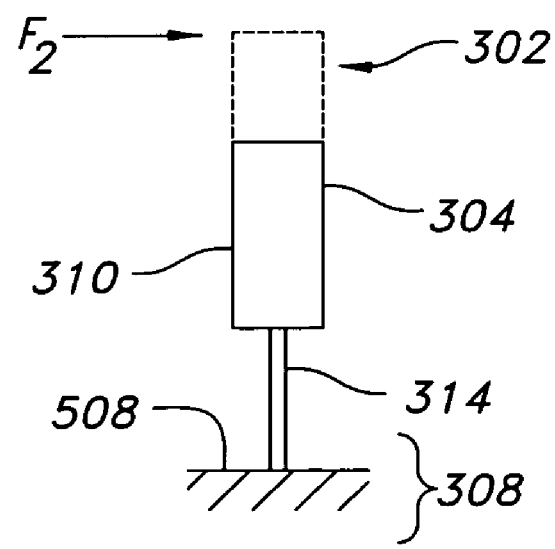
FIG. 7 illustrates central member responding to horizontal forces in horizontal directions.

In other words, as depicted in FIG. 6, engagement between tube 504 and conical base 508 is adjustable. And the size of gap 516 is variable between tube 504 and conical base 508. Concentricity between these two parts will determine the uniformity of resistive forces in a 360 degree circle, such as shown FIG. 4A, illustrating that central member 302 responds to horizontal forces in every horizontal direction F6 through F10. For example, if a force F2 is applied to upper end 304 or an extension thereof as depicted in FIG. 7, it causes spring element 314 to be deflected or torsioned, producing an equal and opposite resistive force. The spring rate of spring element 314 determines its force-deflection characteristics in the XY plane. All applied forces and resistive reaction forces assume that lower end 308 is held mechanically fixed and stationary by base 508 (FIG. 7).

As depicted in FIG. 5, when a sufficient side force F13 is applied to tube 502 which is connected to pivot point 114 (FIG. 1), causing tube 502 to touch base 508, a resulting electrical connection occurs between tube 502 and base 508. Additionally, when a side force F14 is not applied directly to longitudinal-center axis 316 of central member 302, then a sufficiently large horizontal vector component F15, will cause tube 502 and base 508 to touch, and thereby create an electrical connection (to be explained). It is also noted that the amount of force of F13 or F15 must be sufficient to bend spring element 314, and overcome its mechanical bending resistance to make the connection between tube 502 and base 508 resulting in an electrical connection.

Referring back to FIG. 6, it is noted that the center axes interrelationship of tube 502 and base 508 may be offset, or the gap 516 may be non-uniform when central member 302 is stationary. For example, if the tube 502 or base 508 are not circular, or are off center from each other, it is possible that forces in certain horizontal directions may require more or less magnitude to reach preset-threshold distance 124 (e.g., touching of tube 502 with base 508).

Exemplary Vertical-Movement Components

Figure 8:
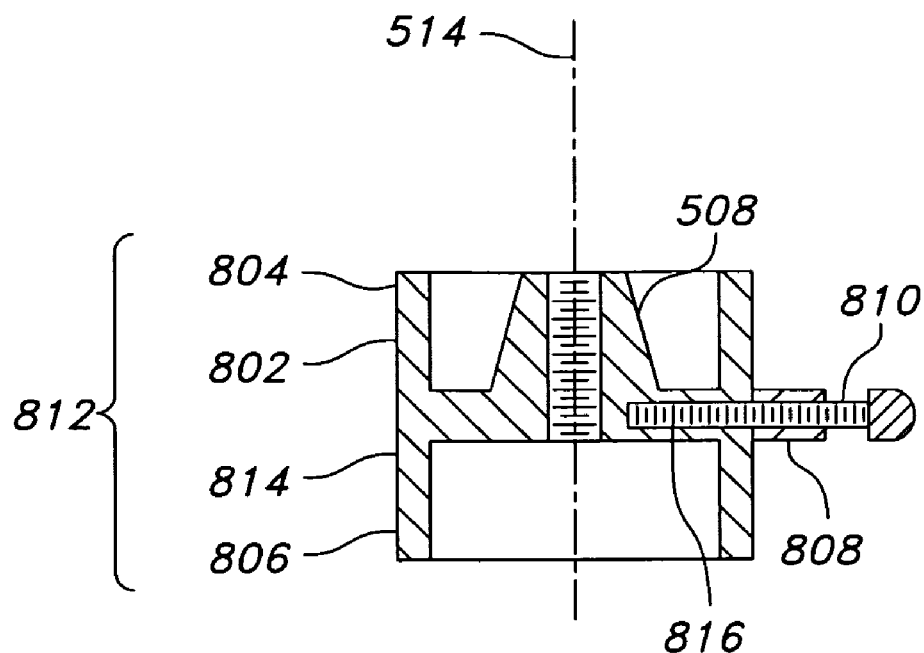
FIG. 8 shows a side cross-sectional view of another embodiment of the conical base.

FIG. 8 shows a side cross-sectional view of another embodiment of conical base 508. This embodiment provides vertical motion to platform 104 (FIG. 1). As depicted in FIG. 8, conical base 508 is integrally connected to a flange 802. Flange 802 includes an upper-circular ring 804, a lower-circular ring 806, a spacer 808, and a male screw 810. Flange 802, upper-circular ring 804, and lower-circular ring 806, form circular unit 812 having a smooth-exterior surface 814. Each of these parts 802, 804, 806 and 808 form a circular unit 812, which may be machined as one part, or assembled as separate parts. A screw thread 816 is perpendicular to longitudinal-center axis 514 of base 508.

In one embodiment, circular unit 812 has diameter measured from exterior surface 814 of approximately 0.5 inches as well as a height of about 0.5 inches. As appreciated by those skilled in the art, with benefit of this disclosure, the diameter and height may vary.

Figure 9:
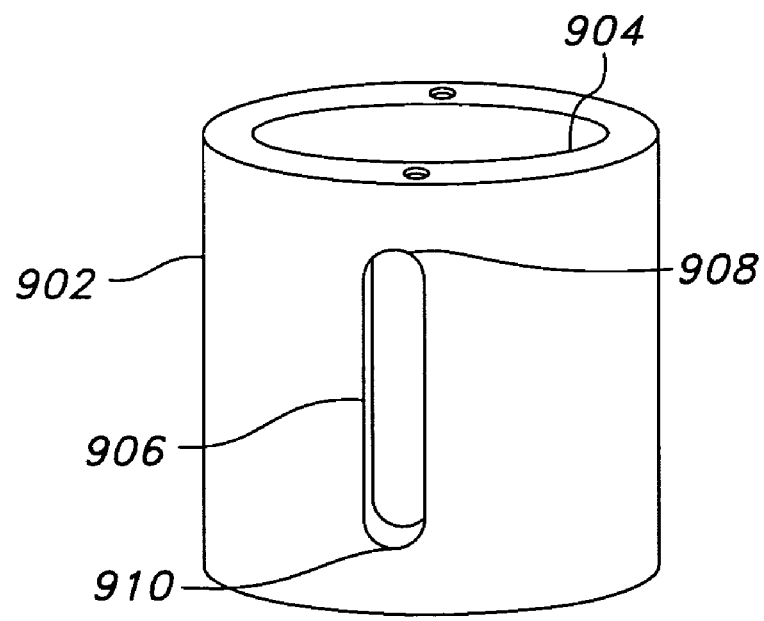
FIG. 9 shows a perspective view of a collar.

FIG. 9 shows a perspective view of a collar 902. Collar 902 includes an inner surface 904, and slot 906. Inner surface 904 is configured to be coextensive with exterior surface 814 (FIG. 8) of circular unit 812 (FIG. 8), providing a close-tolerance fit, but permitting movement (with some friction) of circular unit 812 within collar 902.

Slot 906 is also of an approximate size to snuggly fit a portion of spacer 808 (FIG. 8) therein. Slot 906 includes a top 908 and bottom 910, which allow restricted movement of spacer 808 (FIG. 8) up and down within slot 906. Therefore, the distance between top 908 and bottom 910 less the height of spacer 808, defines the total distance circular unit 812 (FIG. 8) can move up or down. This maximum distance corresponds to preset-threshold distance 124 pivot point 114 can move vertically.

Figure 10:
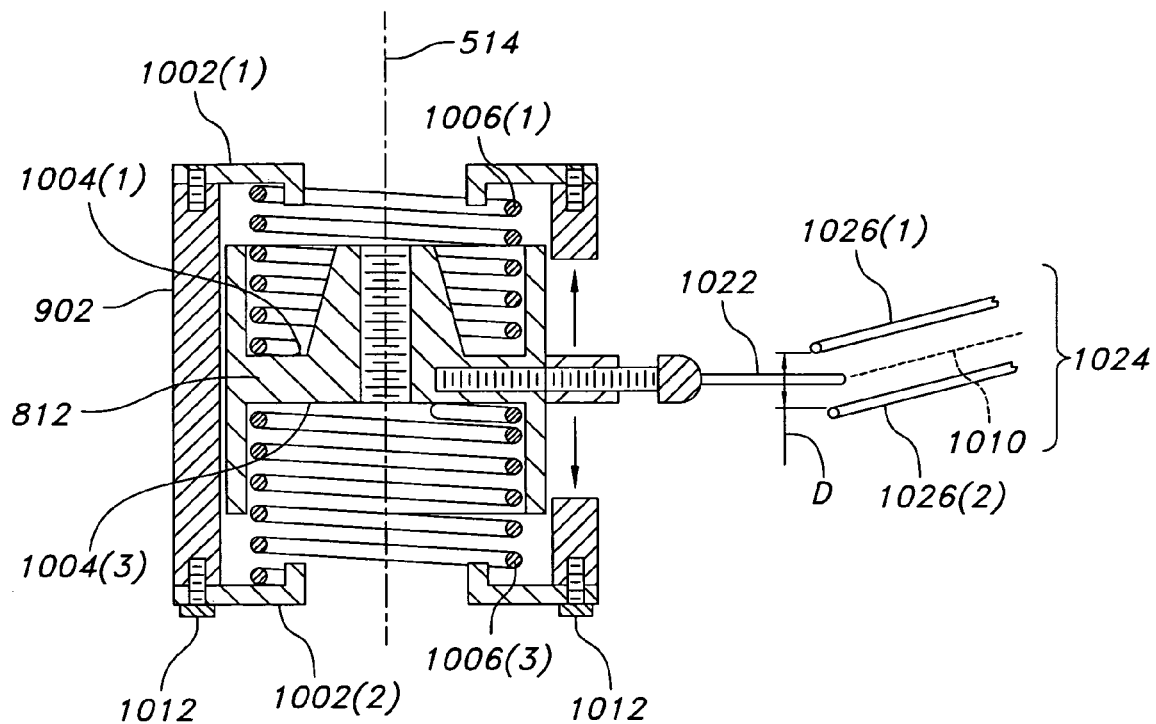
FIG. 10 shows a cross-sectional side view of the circular unit within the collar.

FIG. 10 shows a cross-sectional side view of circular unit 812 within collar 902. At the upper and lower ends of collar 902 are circular washers 1002(1) and 1002(2). Connected between circular washer 1002(1) and upper portions 1004(1) of circular unit 812, is a helical spring 1006(1). Likewise, connected between circular washer 1002(2) and lower portions 1004(3) of circular unit 812, is a helical spring 1006(3).

The compression/expansion of spring 1006(1) acts in opposite fashion to the compression/expansion of spring 1006(3). So, when circular unit 812 moves up (due to an external force pulling up on pivot point 114 (FIG. 1), spring 1006(1) is compressed, and spring 1006(3) expands. Correspondingly, when circular unit 812 moves down (due to an external force pushing down on pivot point 114 (FIG. 1)), spring 1006(1) expands, and spring 1006(3) compresses. It is through springs 1006(1), and 1006(3), that a known spring force/displacement rate is maintained on vertical movement of platform 104. Springs 1006 also impart a resistive force to return pivot point 114 (FIG. 1) to its start position 120 (shown as resting position 1010 in FIG. 10) from any vertical displaced position 122. Helical springs are about 0.4 inches in diameter, 0.4 inches long, and made of 0.02 inch diameter music wire or other suitable material. However, the amount of force maintained by springs 1006, is adjustable.

As appreciated by those skilled in the art, after having the benefit of this disclosure, more than two springs 1006(1) and 1006(3) may be used in other embodiments. Additionally, in other embodiments, other compression/expansion devices may be used in place of springs 1006, such as hydraulic or compressed-air pistons.

As depicted in FIG. 10, screws 1012 (or other fastening means, such as but not limited to glue, rivets, nuts/bolts, etc.) fix collar 902 to housing 102 or a base unit (not shown) located within housing 102 (FIG. 1), which is in turn attached to housing 102 (FIG. 1).

Exemplary Horizontal-Movement Electro-Mechanical Sensor

As described above with reference to FIGS. 5 and 6, when pivot point 114 (FIG. 1) is displaced from a stationary position, i.e., start position 120 (FIG. 1) to a preset-threshold distance 124 (FIG. 1), inner surface 504 of tube 502, and outer surface 512 of conical base 508 touch each other at a location 602 opposite the side where an external force 604 is applied to pivot point 114. This contact between tube 502 and base 508, causes an electrical connection. In other words gap 516 acts as a switch between inner surface 504 of tube 502, and outer surface 512 of conical base 508. Gap 516 operates as an open switch, when the two surfaces are not touching. On the other hand, gap 516 operates as a closed switch, when the two surface are touching.

Figure 11:
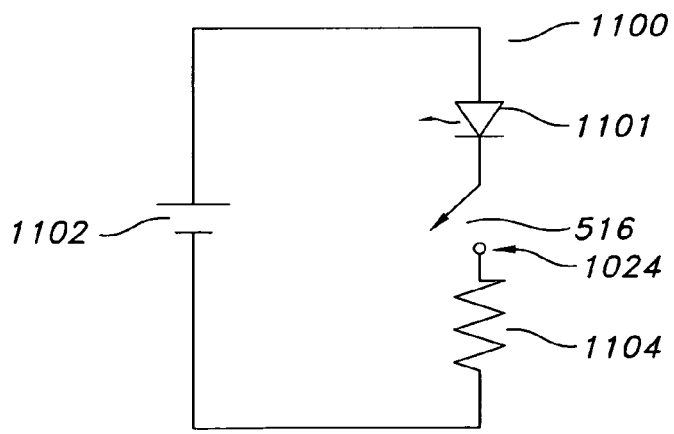
FIG. 11 shows an electrical circuit showing a gap acting as an electrical switch.

FIG. 11 shows an electrical circuit 1100 showing gap 516 acting as an electrical switch. Circuit 1100 includes a power source 1102, such as a battery, switch 516 (corresponding to gap 516), and resistor 1104. In one embodiment, switch 516 provides the functionality of sensor 126(1) (FIG. 1), which transmits a signal (an electrical current), via wire 130, indicating that pivot point 114 moved horizontally a preset-threshold distance 124. As part of circuit 1100 an LED 1101 may be included which provides a visual alert, as long as excessive force is applied to platform 102 (FIG. 1), which causes pivot point 114 to move at least to the preset-threshold distance 124 away from start position 120 (FIG. 1). Other alerting devices (speakers, etc.) may be included in circuit 1100, as would be readily appreciated by those skilled in the art having the benefit of this disclosure. A more detailed schematic diagram is provided below.

Exemplary Vertical-Movement Electro-Mechanical Sensor

Referring back to FIG. 10, attached to an end of a screw head 810 is an electrical-contact member 1022. So, when circular unit 812 moves up and down due to an external force pulling up or pushing down on pivot point 114 (FIG. 1)), electrical-contact member 1022 moves from resting position 1010.

Electrical-contact member 1022 is part of a switch 1024. That is, switch 1024 also includes an upper contact 1026(1) and lower contact 1026(2), which are spaced apart from each other a distance D. This distance D corresponds to preset-threshold distance 124 in the Z plane (vertical direction). Contacts 1026 may be attached to a separate unit (not shown) inside housing 102, such as a circuit board. In another embodiment contacts 1026 may be connected directly to an internal portion of housing 102 (FIG. 1).

When electrical-contact member 1022 touches either contact 1026, it causes a closed circuit condition. Referring back to FIG. 11, this is the equivalent electrical circuit 1100 which shows switch 1024 as the vertical switch sensor. That is, switch 1024 provides the functionality of sensor 126(2) (FIG. 1), which transmits a signal (an electrical current), via wire 132, indicative that pivot point 114 moved vertically a preset-threshold distance 124. As part of circuit 1100 an LED may be included which provides a visual alert, as long as sufficient force is applied to platform 102 (FIG. 1), which causes pivot point 114 to remain a preset-threshold distance away from start position 120 (FIG. 1). Again, other alerting devices (speakers, etc.) may be included in circuit 1100, as would be readily appreciated by those skilled in the art having the benefit of this disclosure.

As appreciated by those skilled in the art, the distance D may be adjusted in length to create a more or less sensitive triggering of an alarm. Furthermore, separation distances between contacts 1022 and 1026(1) and 1026(2) may be equal or unequal depending on an alarm force configuration desired.

In one embodiment the preset-threshold force is approximately one-to-four onces, and the preset-threshold distance 124 in the XY direction is approximately 0.12 inches and in the Z direction is approximately 0.12 inches. As appreciated by those skilled in the art, in other embodiments these forces and distances may be configured to be greater or smaller. For example, if greater sensitivity is desired, then the preset-threshold distance may be calibrated to be smaller, and the preset-threshold force reduced. If less sensitivity is desired, then preset-threshold distance may be calibrated larger, and the preset-threshold force increased. For example, spring forces can be increased by increasing the diameter of spring wire and/or by changing the selection of spring material.

Exemplary Sensor-Module and Alerting Configuration

Figure 12:
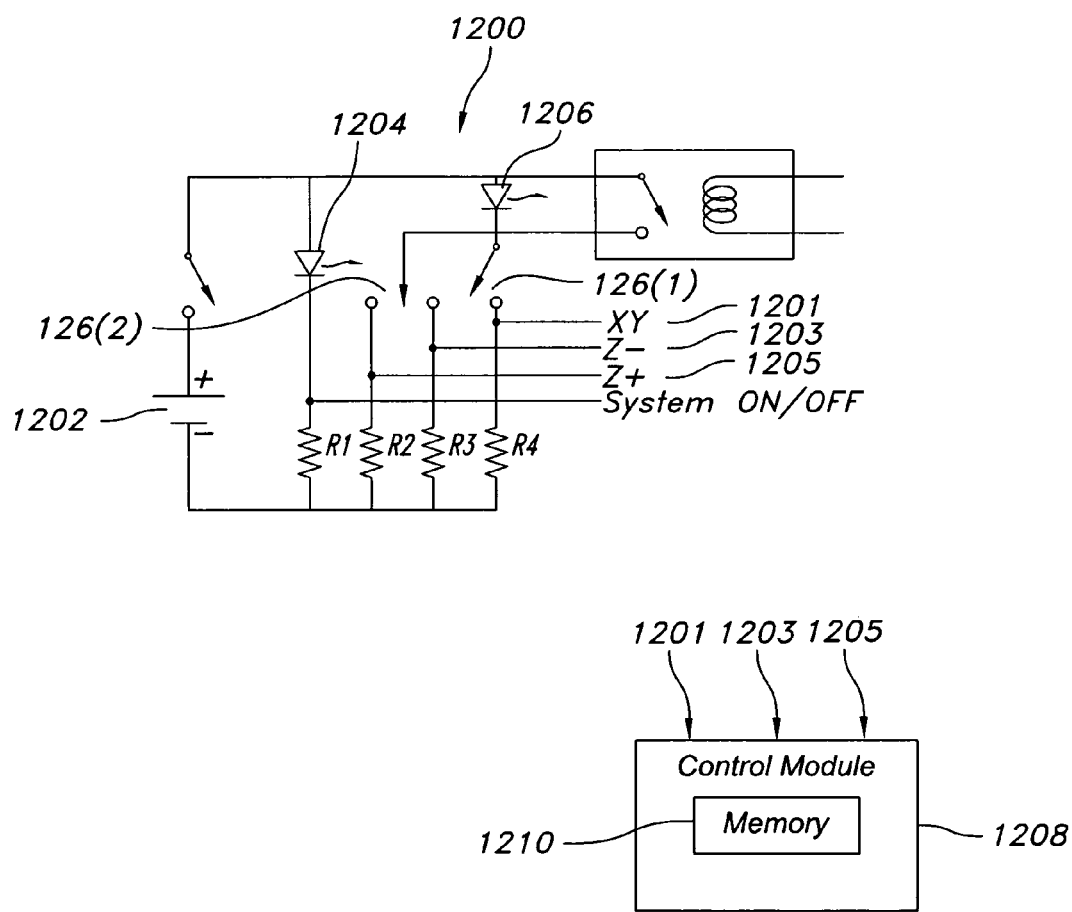
FIG. 12 is a circuit implementation showing sensors for detecting when pivot point exceeds a preset displacement distance horizontally or vertically.

FIG. 12 is a circuit 1200 implementation showing a portion of the sensor module in FIG. 1. Circuit 1200 includes a battery 1202, a power on/off LED 1204, an alarm LED 1206, sensors 126(1), 126(2), resistors R1, R2, R3, and R4, and voltage outputs XY (horizontal) 1201, Z+ (Up), 1205, Z− (down) 1203. A control module 1208 having memory 1210, may be connected to voltage outputs 1201, 1203, and 1205. When an active signal is relayed to either output indicative of excessive force conditions, control module 1208 records in memory 1210 the occurrence. Control module 1208 may be configured to record the data in the form of counts, indicating which particular direction excessive force was applied: XY, Z+, or Z−.

Control module 1208 may be connected to a computer (not shown) by any suitable interface, and information stored in memory 1210 may be read there from. A software module (code) running on the computer processes data read from memory 1210. For example, the software may measure time-to-completion of specified surgical tasks. The software also allows for enhanced images and displays providing feedback to the user including, but not limited to, a quantity, direction, length, and location in the procedure of all transgressions to perform a task. Screen images may then be displayed to the user in any suitable format. As appreciated by those skilled in the art, drivers/firmware (not shown) in control module 1208 as well as code (firmware and/or software) operating on the computer will provide the information to a user in a useful manner.

It is also possible that the information is displayed in graphic format. For example, screen images may display force/distance transgressions specific to lateral displacements in an XY plane, and vertical force/distance transgressions in a Z+ (excessive pulling) plane or Z− (excessive pushing) plane. Reports may also be created by the software that measures the user's performance as to rapidity of motion, and delicacy of motion for various tasks by measuring time-to-completion and delicacy of motion transgressions for specified tasks. These reports may be used by instructors, and trainees to monitor and share acquisition of technique-specific performance goals.

As appreciated by those skilled in the relevant art, control module 1208 may be implemented on a circuit board (see FIG. 16), and packaged inside housing 102 (FIG. 1). One skilled in the pertinent art is familiar with the conventional electronics shown in FIG. 12, will know how to construct such a circuit board for use inside housing 102. Such a design may include the ability to replace battery 1202. Also, as readily appreciated by those skilled in the art, off-the-shelf components may be utilized to implement many components shown in FIG. 12.

Thus, circuit 1200 may form a portion of sensor module 108 (FIG. 1). Additionally, as appreciated by those skilled in the art, other alerting devices such as a speaker (not shown) may be directly or indirectly coupled in circuit 1200. Thus sensor module 108 may track each occurrence pivot point 114 is displaced a preset-threshold distance 124, based on receipt of active signals from sensors 126. Sensor module 108 may also quantify and classify the occurrences based on which direction (horizontal, vertical, or an angular combination thereof) the pivot point moved when reaching a preset-threshold distance 124.

Feedback from sensor module 108 and alerting devices 110 may be provided in real-time, i.e., instantaneously commensurate with detection of overly excessive forces or transgressions.

Exemplary Platform and Interface

Figure 13A:
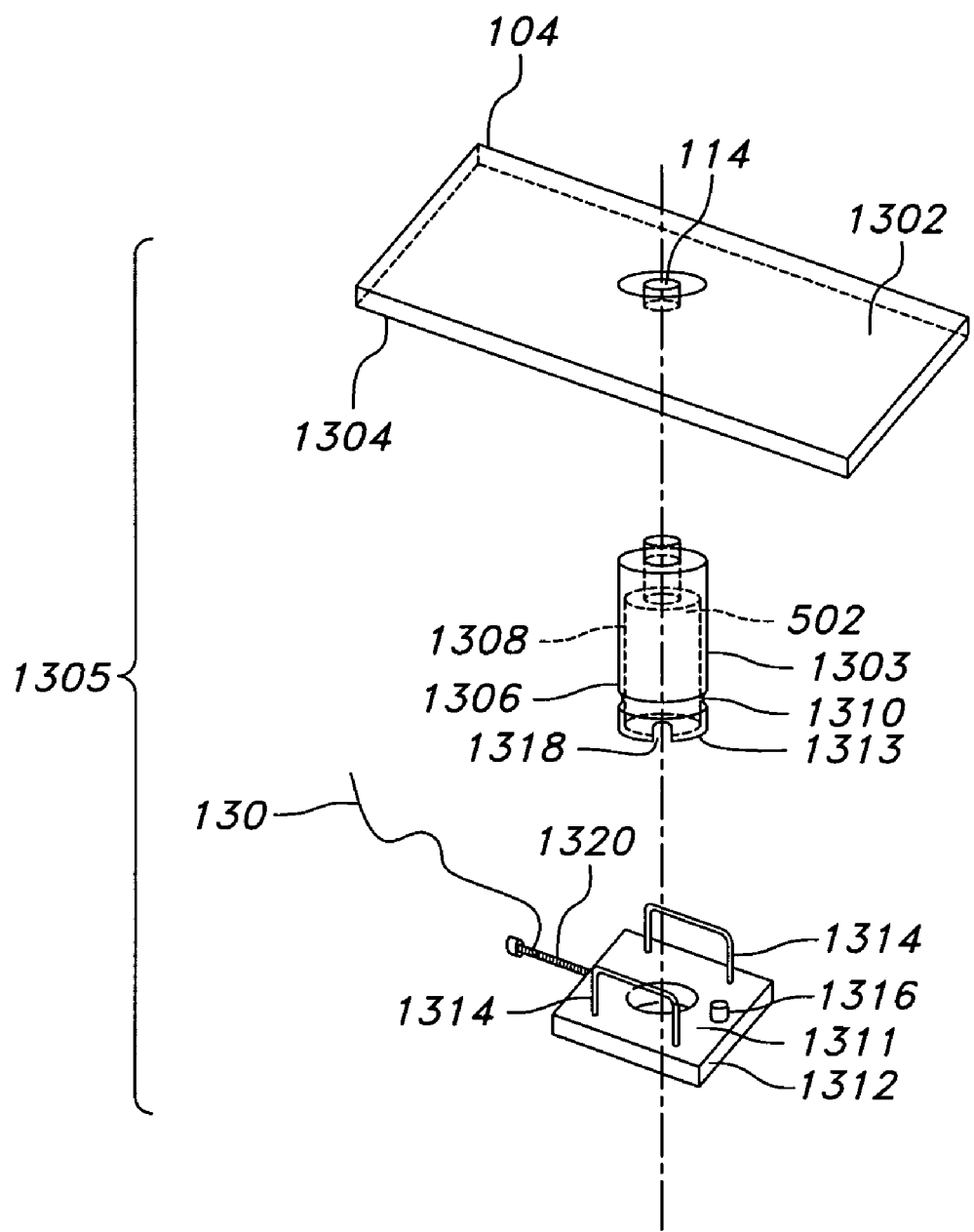
FIG. 13A shows an exemplary implementation for the platform.

FIG. 13A shows an exploded view of platform 104 and its interface to mechanical assembly 106. Platform 104 includes an upper surface 1302, and a lower surface 1304. As depicted in FIG. 13 platform 104 is rectangular being about three inches in length, 1.75 inches wide, with pivot point 114 residing in the center of platform 104, where the longitudinal and horizontal axes converge. As appreciated by those skilled in the art, platform 104 may be of other suitable sizes (larger or smaller), and configurations such as circular, square, triangular, among others. Additionally, pivot point 114 may reside in other locations of platform 114.

Platform 104 is constructed of clear plastic material, but may be configured of other materials such as rubber, metal, wood, other suitable materials, or any desired combinations thereof.

Upper surface 1302 of platform 104 provides a physical stage on which training environments may be setup, which shall be described below with reference to FIGS. 14.

As depicted in FIGS. 14A-14E shows a platform 104, which may be adapted to support an inanimate object, or animal tissue to be utilized in basic-surgical training. These surgical techniques include but are not limited to cutting, knot-tying, suturing, blunt and sharp dissection, clamping, grasping, ligating, clipping, cannulation, stapling, cauterization, and suture cutting, among others. Force/distance transgressions (rough motions) can be instantly viewed at the center of platform 104 whenever LED 318 illuminates, or heard by sound minating from housing 102.

As depicted in FIG. 13A, platform 104 includes a shaft 1306 that extends vertically downward from lower surface 1304. In one embodiment platform 104 may be quickly coupled and decoupled from housing 102. Platform 104 includes a quick connect/disconnect system 1305 for attaching/detaching platform 104 to mechanical assembly 106. For example, shaft 1306 is cylindrical, transparent and includes a hollow inner surface 1308. Shaft 1306 includes an exterior smooth surface 1303, and a groove 1310 within surface 1308. Shaft 1306 is designed to slide over cylindrical tube 502, with inner surface 1308 being coextensive with exterior surface 520 of tube 502 (FIG. 5).

A top surface 1311 of a plate 1312, connected to an exterior surface of tube 502 (FIG. 5) provides a support for platform 104, especially from Z− forces, and during quick attachment of platform 104 to mechanical assembly 106. Two U-shaped spring members 1314 projecting from top surface 1311 of plate 1312 are configured to snap into, and engage groove 1310, when a bottom portion 1313 of shaft 1306 reaches top surface 1311. Spring members 1314 also secure platform 104 to mechanical assembly 106 when platform experiences Z+ forces during surgical procedures. The spring member 1314 are calibrated to release platform 104 (such when detaching platform 104 from housing 102) when pulling forces greatly exceed acceptable surgical manipulations.

A pin 1316 extending from plate 1312 is designed to engage an aligning groove 1318 of shaft 1306. This complementary engagement prevents platform 104 from being turned in a clockwise or counter-clockwise direction, without returning pivot point 114 to its original starting position 120 (FIG. 1), when platform 104 experiences forces in the horizontal (XY) planes.

It should be appreciated by those skilled in the art, with benefit of this disclosure, that quick connect/disconnect system 1305 may consist of other connector technology, such as a push-pull connector system, a bayonet style fastening system, or even a threaded screw system. It is also appreciated that platform 104 may be permanently attached to housing 102 via mechanical assembly 106.

A screw 1320 extends from plate 1312. Screw 1320 provides a support structure for a wire 130, and prevents wire 130 from entangling other parts when plate 1312 moves three-dimensionally. Platform 104 is movably coupled to housing 102. That is, platform 104 is configured for three-dimensional motion relative to an upper portion 109 of housing 102.

Figure 13B:
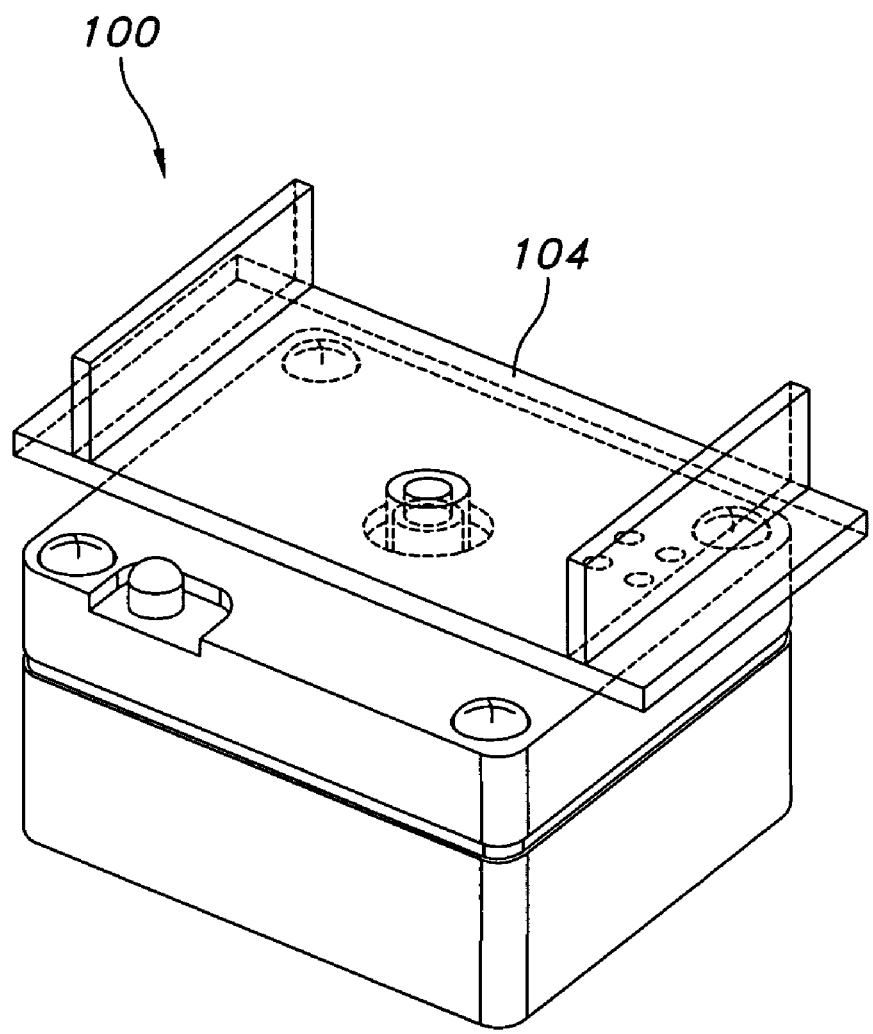
FIG. 13B shows a perspective view of one exemplary implementation of the surgical-training device.

FIG. 13B shows a perspective view of one exemplary implementation of surgical-training device 100. As depicted in FIG. 13B, platform 104 is substantially parallel to a table-top surface on which platform 104 may reside. In this exemplary implementation, platform 104 is translucent.

FIGS. 14A-14E show exemplary practice environments and associated materials that may be set up on a platform 104.

Figure 14A:
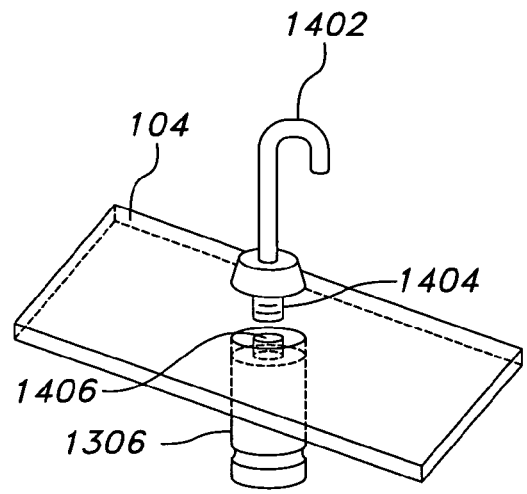
FIGS. 14A-14E show exemplary practice environments and associated materials that may be set up on a platform.

FIG. 14A shows a hook 1402 attachable to platform 104. In this embodiment, hook includes a male-screw portion 1404 configured for attachment to a female thread portion 1406 within shaft 1306. Hook 1402 may serve as a fixture on which to practice tying surgical knots. As appreciated by those skilled in the art, hook 1402 may be permanently attached to platform 104, or attached by other means, such as magnet, a connector, or other suitable means. It should also be appreciated by those skilled in the art, after having the benefit of this disclosure, that hook 1402 may be of various shapes, and sizes. For example, hook 1402 may not be hook-shaped, but may be circular, square shaped, etc.

Figure 14B:
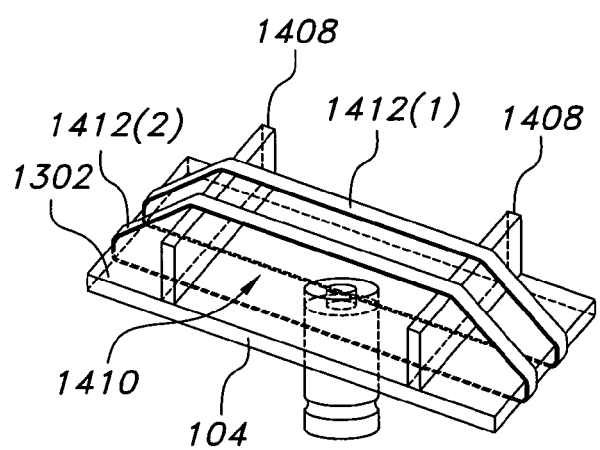

FIG. 14B shows another version of platform 104. In this embodiment, platform 104 includes two vertical-support structures 1408 extending perpendicularly from upper surface 1302. Vertical-support structures 1408 enable materials to be fastened around platform 104, but provide space 1410 between upper surface 1302 and the material. For example, as depicted in FIG. 14B two rubber bands 1412(1), 1412(2) are attached around platform 104. This enables the user to perform simulated surgical techniques on materials unobstructed by upper surface 1302. Tying the rubber bands in apposition by a suture requires maintenance of tension on the suture in a delicate fashion as the knot is tied.

Figure 14C:
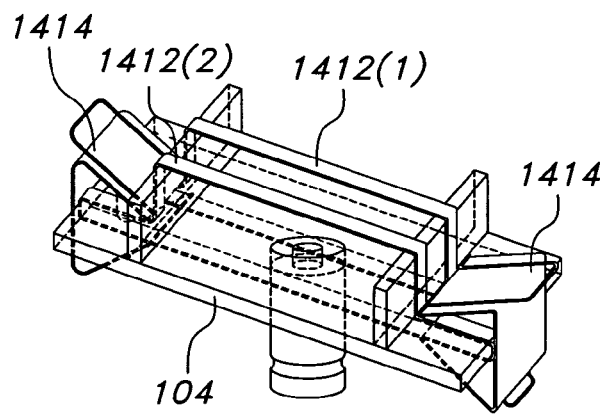

FIG. 14C shows still another exemplary version of platform 104. As depicted in FIG. 14C clamps 1414 may secure rubber bands 1412(1), 1412(2) to both ends of platform 104. In this example, knot typing may be practiced on rubber bands 1412 set at different tensions and spacings.

Figure 14D:
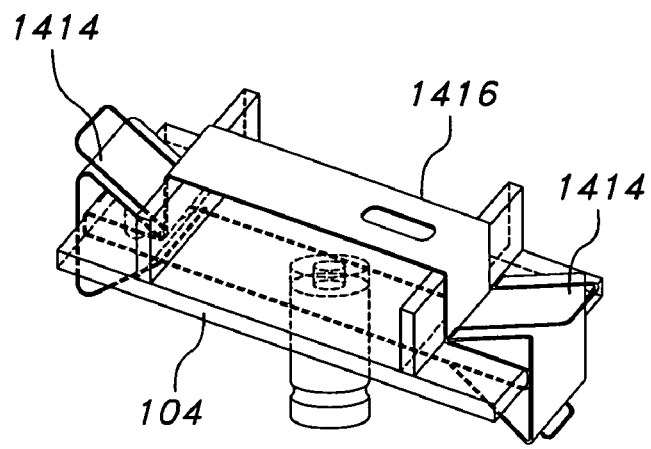

FIG. 14D shows yet another exemplary version of platform 104. In this example, tubing 1416 is secured by clamps 1414 to platform 104. In this example, cutting, stapling, and suturing may be practiced on tubing 1416.

Figure 14E:
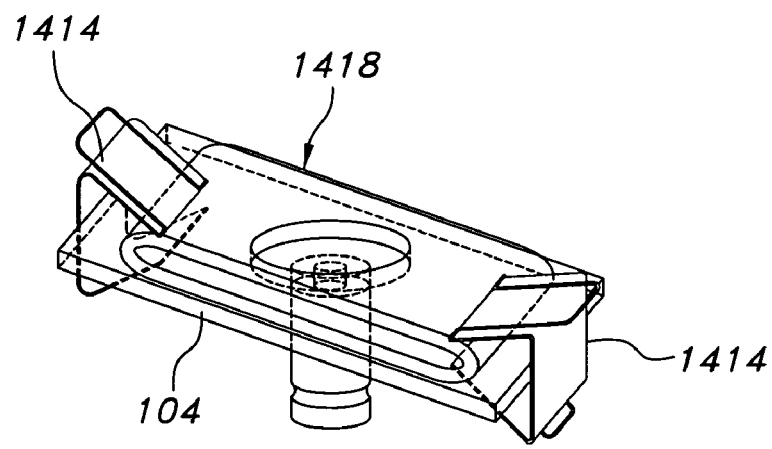

FIG. 14E shows another exemplary version of platform 104. As depicted in FIG. 14E, a material 1418 (such as gauze, clothing, animal material, or other suitable materials) may be secured to platform 104 by clamps 1414. Using this configuration, a user can perform cutting and dissecting exercises on the material.

As used herein, the term "performing a simulated-surgical technique on the platform" refers to: performing a simulated-surgical technique directly on platform 104; performing a simulated-surgical technique to an object residing (directly or indirectly) on platform 104; or performing a simulated-surgical technique to a material supported (directly or indirectly) by platform 104.

Figure 15:
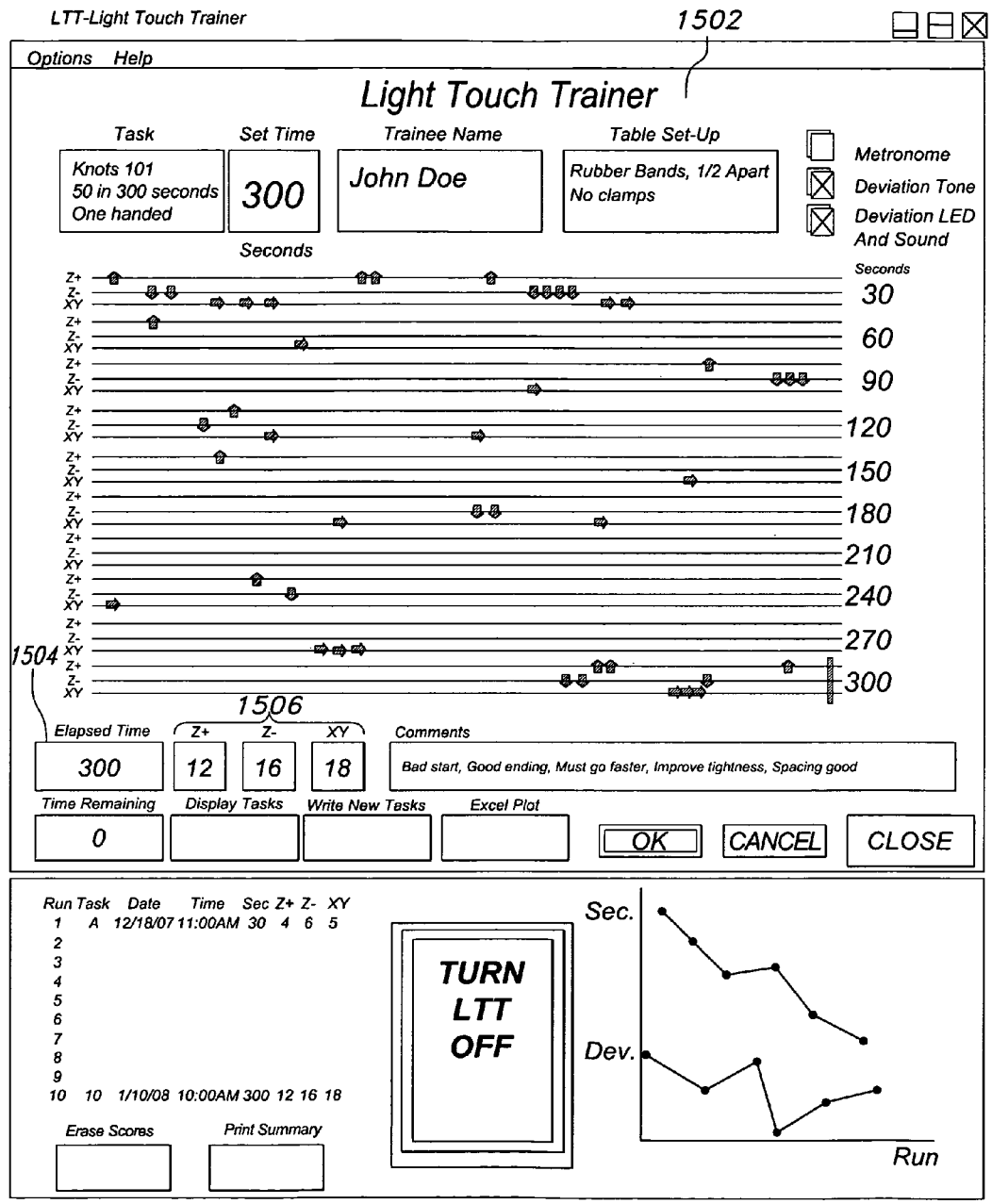
FIG. 15 shows screen shot of an exemplary scoring system.

FIG. 15 shows a screen shot of an exemplary user interface 1502 of a scoring system that may be displayed to a user of a computing device (not shown). Referring to FIG. 15, user interface 1502 enables a user to click on various icons and view different parameters, such as the time-to-completion of a surgical task 1504, the quantity of transgressions 1506 indicating excessive force, and various other indicia and tabs. As appreciated by those skilled in the art, after having the benefit of this disclosure, user interface 1502 may display information in other manners and configurations. Furthermore, certain information may be displayed on a local display device (not shown) collocated on a surface of housing 102 (FIG. 1).

Exemplary Integration of Elements

Figure 16:
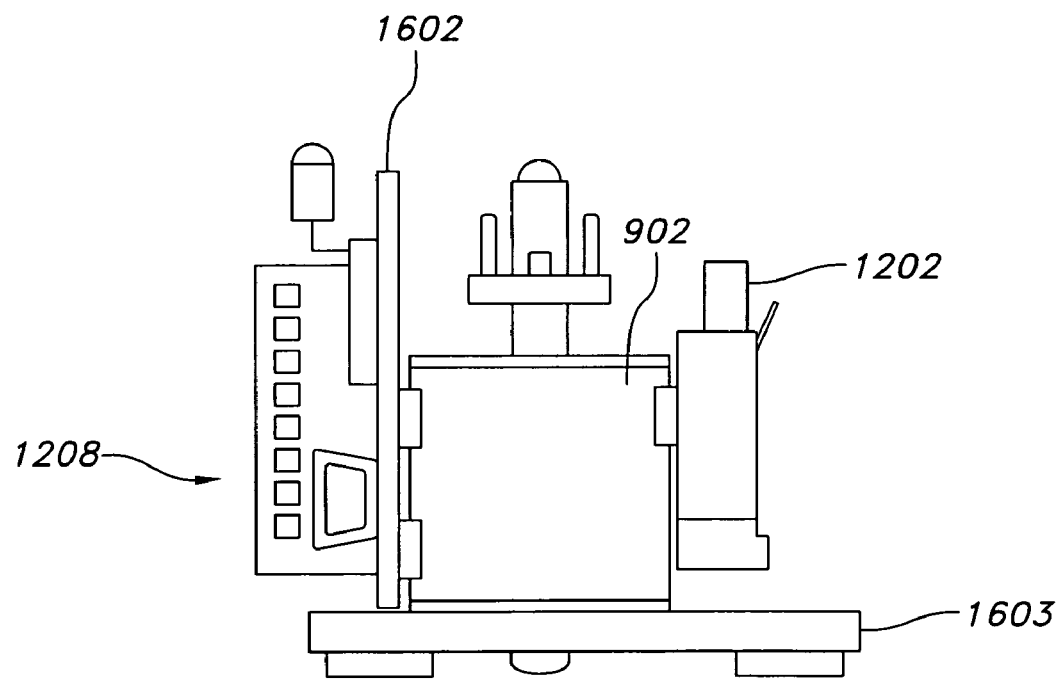
FIG. 16 shows a side view of internal parts configured for insertion inside the housing of a surgical-training device.

FIG. 16 shows a side view of internal parts configured for insertion inside housing 102. As shown in FIG. 16, a power source 1102 (FIG. 11) in the form of a battery that is inserted into a battery holder which is mounted (via screws) to collar 902. Also mounted (also via screws) to collar 902, opposite power source 1102, is a circuit board 1602, which contains circuitry, LED, switch, connector, and control module 1208. Circuit board 1602 is perpendicular with respect to the ground to maximize space inside housing 102. In this exemplary implementation, collar 902 is mounted (via screws) to a floor piece 1603, which provides a footing to anchor elements in housing 102. In the exemplary implantation, floor piece 1603 is wood, but may be other materials such as plastic, metal, foam, or other suitable materials. It is appreciated that floor piece 1603 is optional, and that elements of device 100, may also be mounted directly to the inside of housing 102. As appreciated by those skilled in the art, the mounting means may include fastening devices other than screws, such as glue, pins, staples, connectors, or various other suitable devices.

Figure 17:
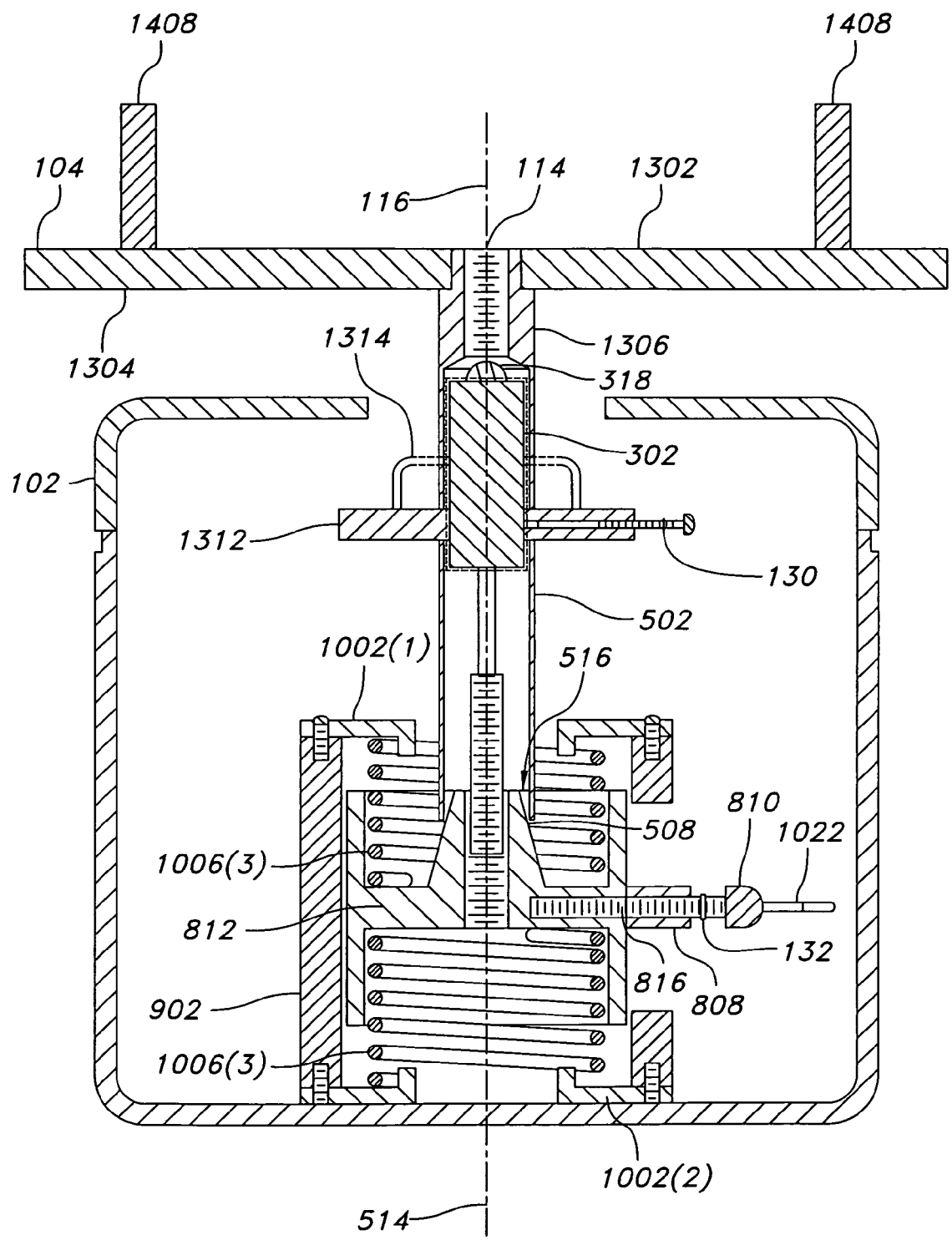
FIG. 17 shows a cross-sectional view of the mechanical assembly portion of the surgical-training device.

FIG. 17 shows a cross-sectional view of mechanical assembly 106 portion of the surgical-training device with platform 104 connected thereto.

The embodiments described herein are to be considered in all respects only as exemplary and not restrictive. The scope of the invention is, therefore, indicated by the subjoined Claims rather by the foregoing description. All changes which come within the meaning and range of equivalency of the Claims are to be embraced within their scope.

What is claimed is:

1. A portable surgical-training device for measuring roughness of a simulated-surgical technique, comprising:
a housing having a size and shape suitable for grasping and portability by a single human hand;
a platform connected to an interface shaft, the platform having a pivot point;
a mechanical assembly fixedly coupled to the housing, the mechanical assembly comprising an upper and a lower spring, vertically oriented with respect to one another, wherein the upper spring has an upper end coupled to the interface shaft and a lower end coupled to an upper end of the lower spring, and wherein a lower end of the lower spring is fixedly attached to the housing, such that the pivot point of the platform is configured for three-dimensional motion relative to the housing, wherein the three-dimensional motion includes motion in an X, Y, or Z plane, or any combination thereof, wherein the pivot point of the platform is further configured to move from a start position to a displaced position when a force is applied to the platform, and to automatically return to the start position from the displaced position when the force applied to the platform is released, wherein a portion of the platform on which a simulated-surgical technique is performed, is positioned external to the housing, wherein the platform is also of a size and shape suitable for grasping and portability by a single human hand; and a sensor module, coupled to the mechanical assembly, configured to determine when the pivot point of the platform moves a distance—from the start position to the displaced position—that exceeds a preset-threshold distance, wherein the preset-threshold distance is a predetermined distance for movement of the pivot point of the platform, that corresponds to a preset-threshold force, wherein the sensor module consists of:

a horizontal movement sensor for measuring movement in the X and Y planes, the horizontal movement sensor consisting of a base constructed, at least in part, of an electrically conductive material, and a tube, wherein at least a portion of the interface shaft is disposed within an inner surface of the tube, wherein when a force is applied to the platform and the pivot point of the platform moves from the start position to the displaced position, the longitudinal-center axis of the tube and the interface shaft remain aligned with the pivot point corresponding to the displaced-threshold position, wherein the longitudinal center axis of the base remains fixedly aligned with the pivot point corresponding to the platform in the start position, and the base and the tube contact each other, directly or indirectly, which causes an electrical connection in communication with the sensor module; and a vertical movement sensor for measuring movement in the Z plane, the vertical movement sensor consisting of an electrically conductive, elongated member, one end of the elongated member being disposed partially between the upper and lower vertically oriented springs, the other end of the elongated member being disposed between first and second electrical contacts disposed proximate to the mechanical assembly, wherein vertical movement of the platform exceeding a preset-threshold distance causes the elongated member to move up or down and contact one of the first and second electrical contacts, which causes an electrical connection in communication with the sensor module;

wherein the pivot point of the platform is also configured to move from the start position to a distance less than the displaced-threshold distance when a force applied to the platform is of a magnitude less than the preset-threshold force, but more than a minimal-preset force.

2. The surgical-training device as recited in claim 1, wherein the interface shaft has a longitudinal axis aligned with the pivot point and substantially parallel with a vertical axis of the housing when the platform is in the start position.

3. The surgical-training device as recited in claim 1, wherein the pivot point of the platform is further configured to remain stationary in the start position when no force is applied to the platform by a user.

4. The surgical-training device as recited in claim 1, wherein the mechanical assembly is configured to apply a predetermined-resistive force to the platform, the predetermined-resistive force resisting movement of the pivot point of the platform from the start position to the displaced position.

5. The surgical-training device as recited in claim 1, wherein the sensor module is further configured to transmit a signal when the distance moved by the pivot point of the platform from the start position to the displaced position meets or exceeds the preset-threshold distance, whereby the signal indicates that a user applied excessive force, and was therefore too rough, when performing the simulated-surgical technique.

6. The surgical-training device as recited in claim 1, wherein the sensor module further comprises means for tracking a number of occurrences when distances between the start position and any displaced position meet or exceed the preset-threshold distance.

7. The surgical-training device as recited in claim 6, wherein the means for tracking the number of occurrences includes a counter.

8. The surgical-training device as recited in claim 6, wherein the means for tracking the number of occurrences is code executing on a processing unit of a controller.

9. The surgical-training device as recited in claim 1, wherein when the force is applied to the platform by a user, the force is applied either directly or indirectly to the platform.

10. The surgical-training device as recited in claim 5, further comprising an alarm configured to receive the signal from the sensor module, and generate at least one of an audible alert and a visual alert.

11. The surgical-training device as recited in claim 5, wherein the signal is a data signal indicating a direction of movement for the pivot point of the platform with respect to the housing.

12. A method of manufacturing a portable surgical-training device, comprising:
configuring a housing in size and shape suitable for grasping and portability by a single human hand;
providing a platform connected to an interface shaft, the platform having a pivot point;
providing a mechanical assembly fixedly coupled to the housing, the mechanical assembly comprising an upper and a lower spring, vertically oriented with respect to one another, wherein the upper spring has an upper end coupled to the interface shaft and a lower end coupled to an upper end of the lower spring, and wherein a lower end of the lower spring is fixedly attached to the housing, such that the pivot point of the platform has three-dimensional motion relative to the housing when the platform is coupled to the interface shaft, wherein the three-dimensional motion includes motion in an X, Y, or Z plane, or any combination thereof, including configuring the pivot point of the platform to move from a start position to a displaced position when a force is applied to the platform as a result of a user performing a simulated-surgical technique on the platform, and configuring the pivot point of the platform to automatically return to the start position from the displaced position when the force applied to the platform by a user is released, wherein a portion of the platform, on which the simulated-surgical technique is performed, is positioned external to the housing;
providing a sensor module within the housing, and coupling the sensor module to the mechanical assembly, wherein the sensor module consists of:
a horizontal movement sensor for measuring movement in the X and Y planes, the horizontal movement sensor consisting of a base constructed, at least in part, of an electrically conductive material, and a tube, wherein at least a portion of the interface shaft is disposed within an inner surface of the tube, wherein when a force is applied to the platform and the pivot point of the platform moves from the start position to the displaced position, the longitudinal-center axis of the tube and the interface shaft remain aligned with the pivot point corresponding to the displaced-threshold position, wherein the longitudinal center axis of the base remains fixedly aligned with the pivot point corresponding to the platform in the start position, and the base and the tube contact each other, directly or indirectly, which causes an electrical connection in communication with the sensor module; and a vertical movement sensor for measuring movement in the Z plane, the vertical movement sensor consisting of an electrically conductive, elongated member, one end of the elongated member being disposed partially between the upper and lower vertically oriented springs, the other end of the elongated member being disposed between first and second electrical contacts disposed proximate to the mechanical assembly, wherein vertical movement of the platform exceeding a preset-threshold distance causes the elongated member to move up or down and contact one of the first and second electrical contacts, which causes an electrical connection in communication with the sensor module;

configuring the sensor module to determine when the pivot point of the platform moves a distance—from the start position to the displaced position—that exceeds a preset-threshold distance, wherein the preset-threshold distance is a predetermined distance for movement of the pivot point of the platform, that corresponds to a preset-threshold force, when a user, performing a simulated-surgical technique on the platform, applies an excessive force to the platform meeting or exceeding the preset-threshold force; and further configuring the pivot point of the platform to move from the start position to a distance less than the displaced-threshold distance when a force applied to the platform by a user is of a magnitude less than the preset-threshold force, but more than a minimal-preset force.

13. The method as recited in claim 12, wherein the interface shaft has a longitudinal axis aligned with the pivot point and substantially parallel with a vertical axis of the housing when the platform is coupled to the interface shaft and the pivot point is in the start position.

14. The method as recited in claim 12, further comprising configuring the pivot point of the platform to remain in the start position and stationary, when no force is applied to the platform by a user.

15. The method as recited in claim 12, wherein the mechanical assembly provides a predetermined-resistive force to the platform when a force is applied to the platform by a user, the predetermined-resistive force opposing movement of the pivot point of the platform from the start position to the displaced position.

16. The method as recited in claim 12, further comprising configuring the sensor module to transmit a signal when the distance moved by the pivot point of the platform, from the start position to the displaced position, exceeds the preset-threshold distance, whereby the signal is indicative that a user applied excessive force while performing the simulated-surgical technique.

17. The method as recited in claim 16, further comprising coupling an alarm to the housing, and configuring the alarm to receive the signal from the sensor module and generate at least one of an audible alert and a visual alert.

18. A portable surgical-training apparatus for measuring roughness of a simulated-surgical technique, comprising:

a housing having an internal portion containing a mechanical assembly, wherein the housing is configured in size and shape such that the housing is suitable for portability and grasping in a single human hand;

a platform having a pivot point;

a column coupled between the platform and the mechanical assembly, the column having a longitudinal axis aligned with the pivot point and substantially parallel with a vertical axis of the housing;

wherein the mechanical assembly comprises an upper and a lower spring, vertically oriented with respect to one another, wherein the upper spring has an upper end coupled to the column and a lower end coupled to an upper end of the lower spring, and wherein a lower end of the lower spring is fixedly attached to the housing;

wherein the platform, is movably coupled to the mechanical assembly and extends beyond an exterior portion and the interior portion of the housing, the pivot point of the platform configured for three-dimensional motion relative to the housing, wherein the three-dimensional motion includes motion in an X, Y, or Z plane, or any combination thereof, wherein the pivot point of the platform is further configured to move from a start position to a displaced position when a force is applied to the platform as a result of a user performing a simulated-surgical technique on a surface of the platform, and to automatically return to the start position from the displaced position when the force applied to the platform by a user is released; and a sensor module, coupled to the mechanical assembly within the internal portion of the housing, configured to determine when the pivot point of the platform moves a distance—from the start position to the displaced position—that exceeds a preset-threshold distance, wherein the sensor module consists of:

a horizontal movement sensor for measuring movement in the X and Y planes, the horizontal movement sensor consisting of a base constructed, at least in part, of an electrically conductive material, and a tube, wherein at least a portion of the column is disposed within an inner surface of the tube, wherein when a force is applied to the platform and the pivot point of the platform moves from the start position to the displaced position, the longitudinal-center axis of the tube and the column remain aligned with the pivot point corresponding to the displaced-threshold position, wherein the longitudinal center axis of the base remains fixedly aligned with the pivot point corresponding to the platform in the start position, and the base and the tube contact each other, directly or indirectly, which causes an electrical connection in communication with the sensor module; and a vertical movement sensor for measuring movement in the Z plane, the vertical movement sensor consisting of an electrically conductive, elongated member, one end of the elongated member being disposed partially between the upper and lower vertically oriented springs, the other end of the elongated member being disposed between first and second electrical contacts disposed proximate to the mechanical assembly, wherein vertical movement of the platform exceeding a preset-threshold distance causes the elongated member to move up or down and contact one of the first and second electrical contacts, which causes an electrical connection in communication with the sensor module.

19. The apparatus of claim 18, wherein the platform is configured to support at least one of an inanimate object and an animal tissue, whereby the inanimate object and the animal tissue is utilized in basic-surgical training.

* * * * *